(12) United States Patent
Oh et al.

(10) Patent No.: US 7,711,778 B2
(45) Date of Patent: May 4, 2010

(54) METHOD FOR TRANSMITTING SOFTWARE ROBOT MESSAGE

(75) Inventors: Joon-Seop Oh, Suwon-si (KR);
Kwang-Choon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 289 days.

(21) Appl. No.: 11/849,846

(22) Filed: Sep. 4, 2007

(65) Prior Publication Data

US 2008/0059594 A1    Mar. 6, 2008

(30) Foreign Application Priority Data

Sep. 5, 2006    (KR) ...................... 10-2006-0085393

(51) Int. Cl.
*G06F 15/16*    (2006.01)
*G06F 15/18*    (2006.01)
(52) U.S. Cl. .................. 709/205; 709/230; 706/13; 706/45; 715/706; 715/757
(58) Field of Classification Search ......... 709/203–207, 709/230; 715/706, 757–758; 706/13, 45
See application file for complete search history.

(56) References Cited

U.S. PATENT DOCUMENTS 5,880,731 A * 3/1999 Liles et al. .................. 715/758

2005/0054381 A1 * 3/2005 Lee et al. ..................... 455/557

FOREIGN PATENT DOCUMENTS

| KR | 1020000059516 | 10/2000 |
|----|---------------|---------|
| KR | 1020020023717 | 3/2002 |
| KR | 1020020079550 | 10/2002 |
| KR | 1020040078322 | 9/2004 |
| KR | 2005-0013671 | 2/2005 |
| KR | 2005-0037070 | 4/2005 |
| KR | 1020050040646 | 5/2005 |
| KR | 1020050084717 | 8/2005 |
| KR | 0546220 | 1/2006 |
| KR | 2006-0036205 | 4/2006 |
| KR | 1020060081861 | 7/2006 |
| WO | WO 2002-13035 | 2/2004 |
| WO | WO 2004-079530 | 9/2004 |

* cited by examiner

*Primary Examiner*—David Lazaro
(74) *Attorney, Agent, or Firm*—The Farrell Law Firm, LLP (57) ABSTRACT

Disclosed is a method for transmitting a software robot (sobot) message including a sobot having a genetic code. The method includes producing a sobot object, which has a genetic code, to be included in the sobot message according to a user input, generating a script file by scripting the produced sobot object, configuring the sobot message according to a user input, and transmitting the script file together with the sobot message.

8 Claims, 5 Drawing Sheets

METHOD FOR TRANSMITTING SOFTWARE ROBOT MESSAGE

PRIORITY

This application claims priority to an application entitled "Method for Transmitting Software Robot Message" filed with the Korean Intellectual Property Office on Sep. 5, 2006 and assigned Serial No. 2006-85393, the contents of which are incorporated herein by reference.

BACKGROUND OF THE INVENTION

1. Field of the Invention

The present invention relates generally to a software robot having a genetic code, and more particularly to a method for transmitting a software robot message.

2. Description of the Related Art

With the prolific development of wired/wireless communication, a vast array of multimedia applications are being provided using various contents in virtual space environments. Further, due to the trend of personalization/differentiation, a user can vary avatars and contents to more uniquely express him/herself. However, although there are a large number of expressions, only a basic combination of preset avatars and contents can be used. Therefore, it is impossible to completely satisfy the user's desires.

Accordingly, an artificial life has been invented, which is able to behave based on its own motivation, emotion, interaction, and selection of actions. The artificial life has a genetic code. A software robot (hereinafter sobot) having a genetic code is an example of the artificial life. The sobot can change its internal state including its internal motivation, homeostasis and emotional state, through interaction between an assigned genetic code and an input of the owner, and can express various behavior patterns according to the change. The genetic code refers to a robot genome composed of a plurality of artificial chromosomes, which include essential element-related genes, internal state-related genes and behavior selection-related genes. The essential element-related genes are composed of parameters of essential elements for internal states, changes in each internal state and external behavior expression. The internal state-related genes are composed of parameters for various external stimulations and the internal states corresponding to the external stimulations. The behavior selection-related genes are composed of parameters for various expression behaviors and the internal states corresponding to the expression behaviors.

There are more than 1000 genetic parameters that can be set as different values depending on each sobot. The behavior of a sobot is determined based on the values of genetic parameters of genetic codes, changes in internal states according to external stimulation and behavior according to the changed internal states, so that a unique sobot can be created. An algorithm which is related to changes in internal states depending on genetic codes and external stimulation, and the selection of an expression behavior according to an internal state is disclosed in Korean Patent Application Laid-open No. 10-2004-78322 of Jong Hwan Kim on Sep. 10, 2004 (entitled "Virtual Life System And Software System For Education Using The Same"), the contents of which are incorporated herein by reference. According to such features, unlike conventional avatars expressing only fixed behaviors specified by the user, the sobot expresses behaviors according to interaction between multiple factors, such as the internal states of the sobot, various environmental factors of virtual space and user input. Therefore, the user can select his/her own unique artificial life.

These sobot features may also be effective in revealing the user's own personality. Accordingly, if the user can utilize his/her own sobot when communicating with other people, the user can better understand him/herself, and the contents of the communication may increase. Thus, it may be desirable to use a sobot, for example, in a method for transmitting/receiving messages. However, because the sobot is output in the form of a moving picture or a three-dimensional (3D) image in order to express various reactions instead of a fixed image, communication using a sobot is problematic due to the increased capacity of a message to be transmitted/received. Moreover, since various backgrounds and music files can be attached to the message, the overall capacity of the message inevitably becomes much larger.

SUMMARY OF THE INVENTION

Accordingly, the present invention has been developed to solve the above-mentioned problem occurring in the art, and the present invention provides a method for transmitting a small capacity message, to which a sobot is attached.

In addition, the present invention provides a method for transmitting a sobot message capable of more clearly revealing the personality of the user.

In order to accomplish these aspects of the present invention, there is provided a method for transmitting a sobot message including a software robot having a genetic code. The method includes producing a sobot object, which has a genetic code, to be included in the sobot message according to a user input, generating a script file by scripting the produced sobot object, configuring the sobot message according to a user input, and transmitting the script file together with the sobot message.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described in detail referring to the accompanying drawings. The same reference numerals are used to denote the same structural elements throughout the drawings. In the following description of the present invention, the detailed description of known functions and configurations incorporated herein is omitted for the sake of clarity and conciseness.

Figure 1:
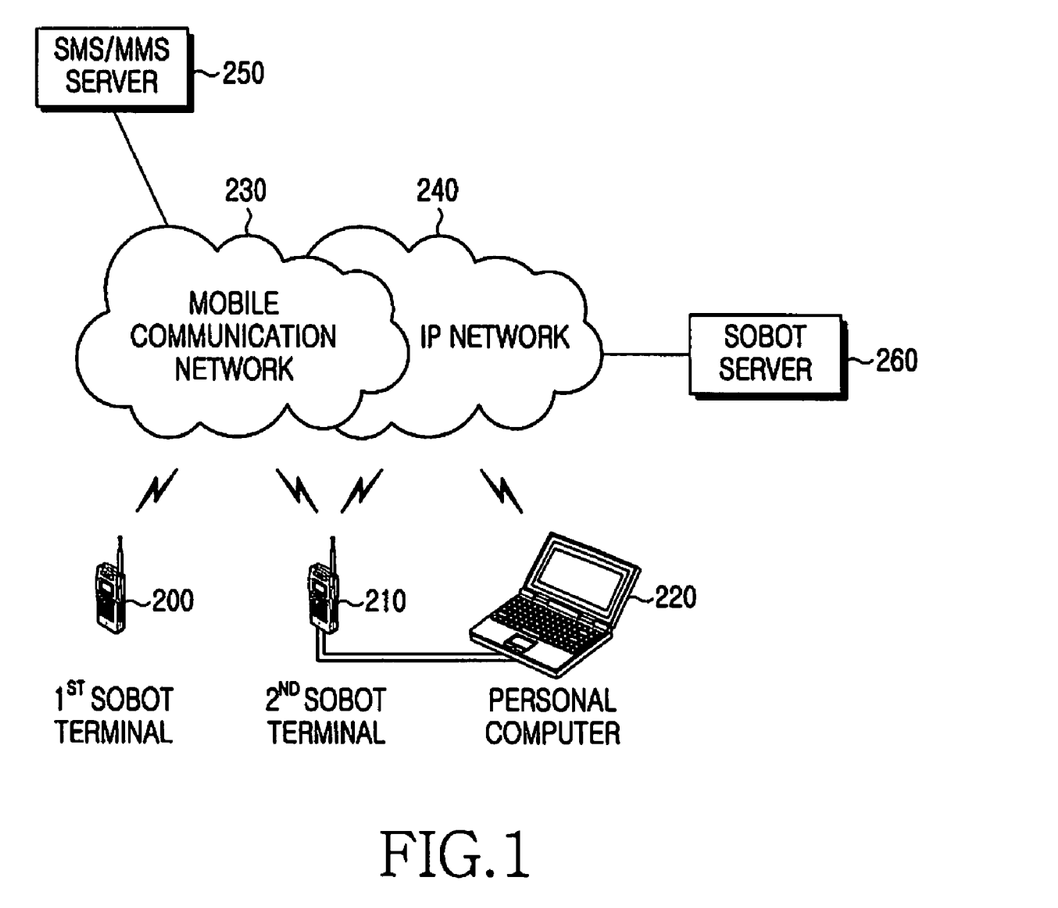
FIG. 1 illustrates a configuration of a software robot system according to the present invention.

A system for sobots having a genetic code, to which the present invention is applied, is illustrated in FIG. 1. The genetic code refers to a robot genome composed of a plurality of artificial chromosomes, which are defined in the robot genome as an intrinsic individuality or personality of the robot, which determines changes in the internal states including motivation, homeostasis and emotional states of the robot, and behavioral expressions according to the changes, through interacting with the external environment of the robot. Herein, the definitions of the motivation, homeostasis, emotion and behavior are expressed in Table 1 below.

TABLE 1

| | |
|---|---|
| Motivation | a process of awakening, maintaining one's activity and controlling the pattern of the activity. a cause of selecting and performing activity such as a curiosity, a familiarity, a boredom, a desire to avoid, a desire to possess and a desire to control |
| Homeostasis | a function of stabilizing physiological state of entity despite one's continuous internal and external environmental changes. a cause of selection and performance of behavior such as a hunger, a sleepiness and fatigue. |
| Emotion | a subjective agitation caused by one's behavior such as a happiness, a sadness, an anger and a fear. |
| Behavior | a general term for performance by an entity such as moving to or stopping at a specific point. In case of animals, sleeping, eating, running can be examples. The number of behaviors an entity can select is limited. Each of che entities can perform only one behavior at a certain moment. |

A plurality of artificial chromosomes includes essential element-related genes, internal state-related genes and behavior selection-related genes, each of which is described above in the Background. Also described above is the algorithm which is related to changes in internal states depending on genetic codes and external stimulation, and related to selection of an expression behavior according to an internal state. Both of these descriptions apply to the present invention.

FIG. 1 illustrates the configuration of a sobot system, to which the present invention is applied. The sobot system includes sobot terminals 200 and 210, a personal computer 220, a sobot server 260, a Short Message Service/Multimedia Messaging Service (SMS/MMS) server 250, a mobile communication network 230 and an Internet Protocol (IP) network 240.

The SMS/MMS server 250 connects with the mobile communication network 230 to provide the short message and multimedia messaging service. The sobot server 260 provides services for production, creation, sale, transition and authentication of a sobot object, and also provides a sobot platform update service to the sobot terminals. The sobot server 260 initially produces and creates new sobot objects according to the requests of the sobot terminals 200, 210 and 220, and provides a sale service of transmitting the initially created sobot objects to the sobot terminals 200, 210 and 220. The sobot server 260 provides services for sobot object transition among the sobot terminals 200, 210 and 220, management of information on each sobot terminal and sobot resource update.

Each of the sobot terminals 200, 210 and 220 includes a sobot platform capable of creating and managing a sobot, and enables mobile communication and IP communication. The first and second sobot terminals 200 and 210, which enable the mobile and IP communication, may be implemented by a mobile phone or a PDA terminal, for example. The personal computer 220 can connect with the sobot server 260 and the SMS/MMS server 250 through an IP network 240, and includes a sobot platform having an artificial life engine which performs an algorithm related to changes in internal states depending on the genetic codes of each sobot object and external stimulation, and related to selection of a behavioral expression according to the internal states. The sobot platform also includes a sobot viewer necessary for visibly outputting the sobot object, various output applications, a sobot communication unit capable of transmitting a sobot object to an external device, and a user application module for outputting an external input (such as a user input) to the sobot viewer, the sobot communication unit and the artificial life engine. The sobot terminals 200, 210 and 220 connect with the IP network 240 through the mobile communication network 230 to communicate with the sobot server 260, and to receive the SMS/MMS from the SMS/MMS server 250.

Figure 2:
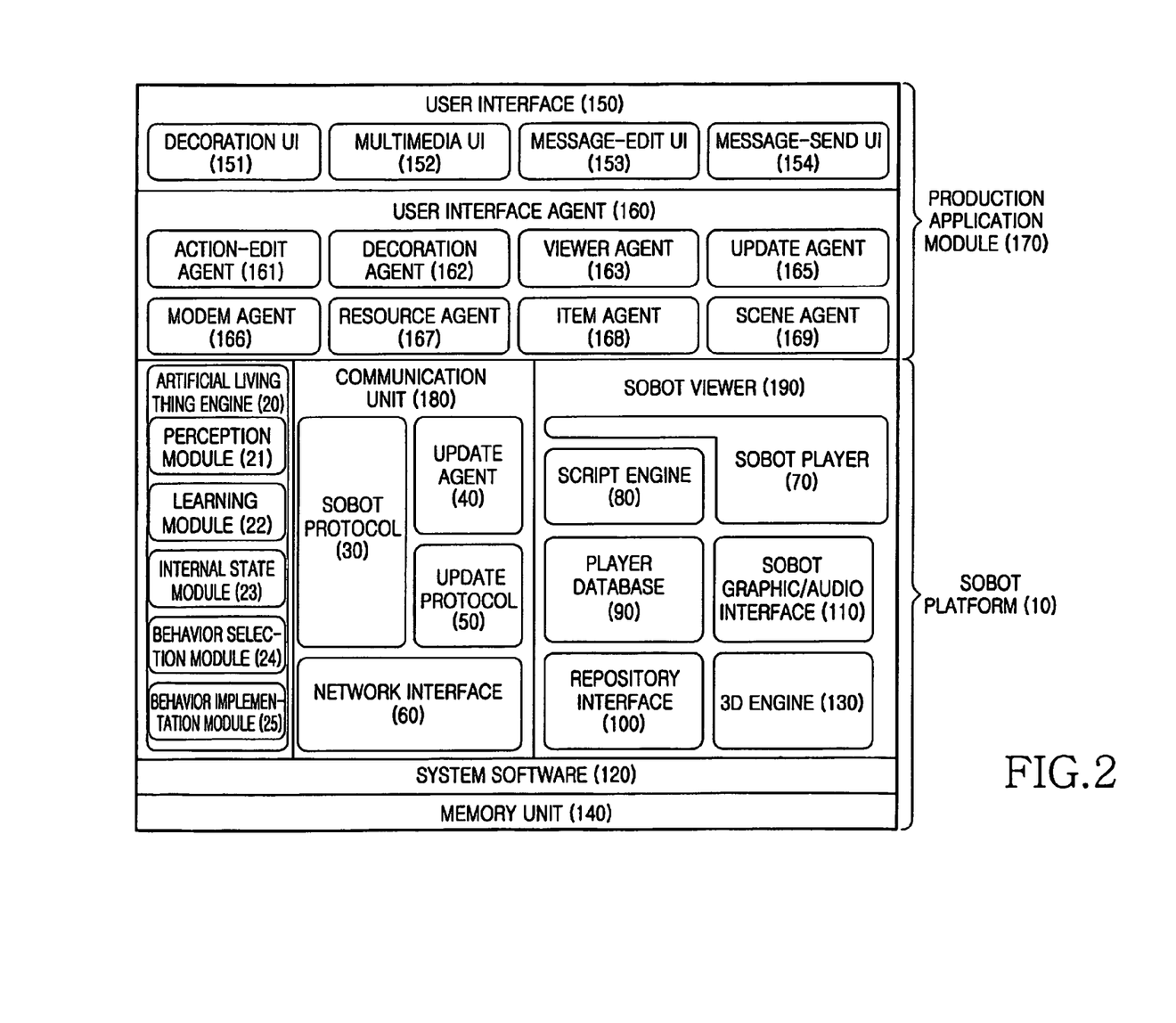
FIG. 2 illustrates a configuration of a software robot terminal according to the present invention.

FIG. 2 illustrates the configuration of the first sobot terminal 200. While the following description is given about the configuration of the first sobot terminal 200 with reference to the FIG. 2, the configuration of FIG. 2 may be applied to the second sobot terminal and the personal computer 220 in the same manner. Referring to FIG. 2, the first sobot terminal includes a sobot platform 10, a production application module 170, a system software 120 and a memory unit 140, in which the sobot platform 10 contains an artificial life engine 20, a communication unit 180 and a sobot viewer 190.

The memory unit 140 stores sobot data corresponding to each of one or more sobot objects. The sobot data includes a genetic code and basic model, internal state, action and resource information of a corresponding sobot object.

The genetic code refers to a robot genome composed of a plurality of artificial chromosomes, which may be classified into essential element-related genes, internal state-related genes and behavior selection-related genes. The essential element-related genes refer to essential parameters greatly influencing changes in the internal states and the external behavior expression. The internal state-related genes refer to parameters influencing the internal state of a robot in connection with an external input applied to the robot. The behavior selection-related genes refer to parameters for determining an external behavior corresponding to an internal state, according to a currently determined internal state.

The genetic code is intrinsically determined in correspondence with a related sobot object, and does not change. The basic model information refers to information on the sort and model of the sobot object to which the genetic code is applied, and may include characters such as a puppy, a cat and a robot. The internal state information refers to information on internal states including motivation, homeostasis and emotion which are changed by the artificial life engine 20, depending on a user input, an external input (such as an external stimulation) sensed through a sensor, and a corresponding genetic code, at the state that a related sobot object is implemented and output in the form that the user can recognize. The action information refers to information on expression behaviors determined by the artificial life engine 20 according to the internal state information. The resource information refers to information on various sub-items established corresponding to the related sobot. For example, the resource information may include an accessory or a background that the sobot object can adopt.

The sobot platform 10 visibly outputs, performs communication related to and drives the sobot object, and includes the artificial life engine 20, the communication unit 180 and the sobot viewer 190.

The artificial life engine 20 includes a perception module 21, a learning module 22, an internal state module 23, a behavior selection module 24 and a behavior implementation module (e.g., motor module) 25. The artificial life engine 20 determines changes of the internal states of the sobot (i.e., changes of emotion, homeostasis and motivation), and the output of an external behavior (e.g., a behavior or a facial expression) corresponding to the changes, in response to an input applied to the sobot under an environment. The artificial life engine 20 can store, maintain and manage information about a personality and sensitivity of the sobot by using an intermediate called a genetic code. Therefore, it is possible, through the artificial life engine 20, to create personalities and sensitivities of sobots having different genetic codes. Additionally, as the artificial life engine 20 includes a learning function, a memory function and instinct expression function of a sobot, the artificial life engine 20 determines an external behavior to be expressed according to data collected by the functions. An algorithm which changes the internal state of a sobot according to a genetic code related to the sobot and an external input, determines a consequent expression behavior, and performs the learning function is disclosed in Korean Patent Application Laid-open No. 10-2004-78322 of Jong Hwan, Kim on Sep. 10, 2004 (entitled "Virtual Life System And Software System For Education Using The Same.")

The communication unit 180 performs the communication of the sobot terminal such as transmission/reception of a sobot message, and includes a sobot protocol module 30, an update agent 40, an update protocol module 50 and a network interface 60.

The sobot protocol module 30 refers to a protocol for communicating with the sobot server managing transition, information and authentication of a sobot object, and communicating with other external devices. All information on the sobot is transmitted to the sobot server 260 and external devices through the sobot protocol module 30.

The update agent 40 refers to a sub-system for updating the file configuration and resources for the sobot terminal platform, and controls all sobot updates. When connecting with the sobot server, the update agent 40 compares a sobot's update version stored in the sobot terminal with an update version being currently provided by the sobot server. As a result of the comparison, when there is data to be updated, the update agent 40 requests the data to be updated to the sobot server, and updates the resources and configuration file of the sobot terminal platform by receiving the data from the server and applying the received data.

The update protocol module 50 includes an Object Management Architecture Device Management (OMA DM) protocol, which corresponds to a protocol that performs a practical update according to the control of the update agent 40.

A network interface 60 provides an interface necessary for network connection between the sobot terminal and the sobot server and between the sobot terminal and the external devices. For example, when serial communication, TCP/IP communication or communication using the SMS/MMS is performed, the network interface 60 provides an interface necessary for corresponding communication.

The sobot viewer 190 includes a sobot player 70, a script engine 80, a player database 90, a repository interface 100, a sobot graphic/audio interface 110 and a 3D engine 130. The sobot viewer 190 is independent of the terminal system and is driven by a virtual machine based on a script language to provide a wide array of applications. Therefore, all terminals equipped with the sobot viewer 190 can operate a sobot object by the same code. In the sobot viewer 190, a sobot script file based on a script language is delivered when being executed or is temporarily stored, and is interpreted by the script engine 80 to be executed. The result from the interpretation by the script engine 80 is rendered through the sobot graphic/audio interface 110 and the 3D engine 130, and is output as a 3D image to the display unit of the sobot terminal.

Since the sobot script file describes not only a motion at a local position but also an interaction with the sobot server 260, a sobot object accepts both an autonomous behavior in the first sobot terminal 200 and a concept of a network robot based on the sobot server 260. The sobot viewer 190 opens interface to provide a solution for creating various sobot objects so that other enterprisers such as a contents provider can create their own special services by using the sobot viewer 190.

The sobot graphic/audio interface 110 and the 3D engine 130 refer to final output applications for outputting a sobot. The sobot may be output in the form of a graphic, a text or audio, according to the types of output applications included in the sobot terminal. For example, when the sobot terminal includes the sobot graphic/audio interface 110 and the 3D engine 130, as described in an embodiment of the present invention, the sobot terminal outputs the sobot in the form of 3D images. As another example, when the sobot platform is installed in the robot and is configured to include a robot operation application as a final output application, the sobot object can be implemented by the robot.

The script engine 80 performs encoding and decoding of a sobot script file related to a sobot object under the control of the sobot player 70. The sobot script file includes an action script file and a transmission script file according to the present invention. The action script file defines each of the actions so as to actually drive various executable actions of the sobot. The sobot action includes various facial expressions which can be expressed by the sobot, for example, a smile, tear or grimace, and actions such as walking, running, lying and sitting. The action script file for generating each of the actions may include data representing more than one action, and may include a plurality of actions and associated relations. The action script file may be configured by the sobot server 260 or the sobot terminals 200, 210 and 220.

The transmission script file refers to a file in which sounds, images and sobot's actions related to the sobot object included in the sobot message are scripted, in order to simplify transmission by reducing the capacity of a transmitted sobot message including the sobot object. The configuration of the transmission script file is defined as a built-in function, a conditional statement, an operation, a keyword and attributes thereof. The built-in function represents the executions for a sound play, a background output, an action performance and the like, and may be controlled by the conditional statement or operation. Internal variables are classified into a fundamental attribute and a user-defined input variable which should be preset before being used.

Accordingly, the script engine 80 parses the action script file pre-stored in the player database 90 to make the action script file executable so that the sobot can execute a corresponding action, and generates an action script file by scripting an action and then stores the action script file in the player database 90, according to the control of the sobot player 70. The script engine 80 generates a transmission script file by scripting a sobot object to be attached to the sobot message, and attaches the transmission script file to the sobot message.

The player database 90 stores a plurality of action script files, and data necessary for outputting the sobot in relation to the output application included in the sobot terminal. According to the present invention, the player database 90 stores 3D modeling-related information, texts and operation information, for example.

When the sobot is output, the repository interface 100 provides interfaces of the sobot player 70, the player database 90 and the memory unit 140, extracts the action scripts stored in the player database 90 and sobot data stored in the memory unit 140, and then outputs the action scripts and sobot data to the sobot player 70.

The sobot player 70 provides interfaces for the production application module 170, the script engine 80, the player database 90, the repository interface 100, the sobot graphic/audio interface 110 and the 3D engine 130 for the purpose of the actual output and action control of the sobot. That is, when a sobot output command for a sobot is input through the production application module 170, the sobot player 70 acquires sobot data stored in the memory unit 140 through the repository interface 100. Additionally, the sobot player 70 detects action information from the sobot data, acquires an action script file corresponding to the detected action information from the player database 90 through the repository interface 100, and outputs the action script file to the script engine 80 through the sobot graphic/audio interface 110. The sobot player 70 further outputs basic model information and resource information in the sobot data to the sobot graphic/audio interface 110. Accordingly, the sobot graphic/audio interface 110 visibly outputs the sobot in cooperation with the 3D engine 130.

Under the condition that the sobot object has been output, as described above, an incoming user input is output to the artificial life engine 20 through the production application module 170. The user input may be an input value caused when the user selects a menu, such as feeding, provided to the user as a text. The artificial life engine 20 reads the genetic code of the corresponding sobot from the memory unit 140, changes the internal state of the corresponding sobot by using the user input and read genetic code, determines a behavior corresponding to the changed internal state, and outputs a request specifying an action corresponding to the behavior to the production application module 170. The production application module 170 outputs the action specified by the artificial life engine 20 to sobot player 70. The sobot player 70 acquires an action script corresponding to the specified action through the repository interface 100 and transfers the action script to the sobot graphic/audio interface 110. The sobot graphic/audio interface 110 outputs the transferred action script to the script engine 80, which parses the action script and outputs the parsed action script to the sobot graphic/audio interface 110. The sobot graphic/audio interface 110 outputs an image and audio for the sobot to perform an action according to the action script, in cooperation with the 3D engine 130.

Also, when a plurality of sobot data is stored in the memory unit 140, if a request for changing the sobot which is being output through the production application module 170 is input, the sobot player 70 interrupts the output of the sobot and outputs a different sobot requested to be output, in cooperation with the repository interface 100 and the sobot graphic/audio interface 110. In this case, if sobot data related to the outputted sobot is changed, the changed sobot data is stored in the memory unit 140.

The sobot player 70 performs operations of managing sobot data, actions, items, scenes and resources, as well as the sobot outputting operation as described above.

Command functions used among the sobot player 70, the sobot graphic/audio interface 110, the repository interface 100 and the script engines 80 during the aforementioned procedure are described in Table 2 to Table 5 below. Table 2 shows functions which the sobot graphic/audio interface 110 receives, Table 3 shows functions which the sobot player 70 receives, Table 4 shows functions which the repository interface 100 receives, and Table 5 shows functions which the script engine 80 receives.

TABLE 2

| | |
|---|---|
| CreateDevice( ) | Create an output device. |
| MakeScene( ) | Make a 3D display output by using model information |
| SetAction( ) | Set action information to be performed |
| GetSceneManager( ) | Get a scene manager |
| MoveCamera( ) | Move the position of a camera |
| SetModel( ) | Newly set a sobot object to be output |
| AddModel( ) | Add a model to a 3D scene |
| RemoveModel( ) | Remove a model from a 3D scene |
| MoveModel( ) | Move the position of a model. Perform the set action, moving the position of the model |
| Render( ) | Output a result of modeling to an output device. |
| SetBGM( ) | Set background music |
| PlayBGM( ) | Play background music |
| StopBGM( ) | Stop background music |

TABLE 3

| | |
|---|---|
| InitPlayer( ) | Initialize a player. Specify a graphic output target |
| ShowSobot( ) | Output a sobot object to a device |
| SetAction( ) | Set an action of a selected sobot object |
| GetGraphics( ) | Get a sobot graphic interface |
| SetResolution( ) | Set the resolution of an output device |
| GetResolution( ) | Get the resolution of an output device |
| ChangeSobot( ) | Change an output sobot |
| GetSobotList( ) | Get the complete sobot list |
| AddSobot( ) | Add a sobot |
| GetSobot( ) | Get sobot information |
| DeleteSobot( ) | Delete a sobot |
| GetActionList( ) | Get a list of actions which a model performs |
| GetAction ( ) | Return action information |
| AddAction( ) | Add action information |
| DeleteAction( ) | Delete action information |
| GetItemList( ) | Get a list of items applicable to the model |
| GetItem( ) | Get an item |
| AddItem( ) | Add an item |
| DeleteItem( ) | Delete an item |
| GetSceneList( ) | Get a list of scene information used for 3D background |
| GetScene( ) | Get a scene |
| AddScene( ) | Add a scene |
| DeleteScene( ) | Delete a scene |
| GetResourceList( ) | Get a resource list |
| GetResource( ) | Get a resource |
| AddResource( ) | Add a resource |
| DeleteResource( ) | Delete a resource |

TABLE 4

| | |
|---|---|
| RunScript( ) | Run script |
| GetSobatList( ) | Get the complete sobot list |
| AddSobot( ) | Add a sobot |
| GetSobot( ) | Get sobot information |
| DeleteSobot( ) | Delete a sobot |
| GetActionList( ) | Get a list of actions which a model performs |
| GetAction ( ) | Return action information |
| AddAction( ) | Add action information |

TABLE 4-continued

| | |
|---|---|
| DeleteAction( ) | Delete action information |
| GetItemList( ) | Get a list of items applicable to the model |
| GetItem( ) | Get an item |
| AddItem( ) | Add an item |
| DeleteItem( ) | Delete an item |
| GetSceneList( ) | Get a list of scene information used for 3D background |
| GetScene( ) | Get a scene |
| AddScene( ) | Add a scene |
| DeleteScene( ) | Delete a scene |
| GetResourceList( ) | Get a resource list |
| GetResource( ) | Get a resource |
| AddResource( ) | Add a resource |
| DeleteResource( ) | Delete a resource |

TABLE 5

| | |
|---|---|
| Parse( ) | Parsing |
| RunScript( ) | |

Referring back to FIG. 2, the production application module 170 provides a user interface related to sobot production and sobot message production, and includes a user interface 150 and a user interface agent 160.

The production application module 170, which corresponds to the uppermost layer, provides an external input interface, and includes the user interface 150 and the user interface agent 160. The user interface 150 provides a user interface necessary for sobot and message production utilizing a sobot, and includes a decoration User Interface (UI) 151, a multimedia UI 152, a message-edit UI 153 and a message-send UI 154. The decoration UI 151 provides a user interface allowing a sobot and a background to be variously changed through applying items to the sobot and the background. The multimedia UI 152 provides a user interface allowing multimedia to be created through combining actions, backgrounds and sounds, for example. The message-edit UI 153 provides a user interface allowing a sobot message to be created through utilizing a sobot object. The message-send UI 154 provides a user interface necessary for sending a sobot message.

The user interface agent 160 corresponds to an agent providing a user interface function related to the sobot production, and includes an action-edit agent 161, a decoration agent 162, a viewer agent 163, an update agent 165, a modem agent 166, a resource agent 167, an item agent 168 and a scene agent 169.

The action-edit agent 161 serves as a user interface related to assignment of an action to the sobot object. The decoration agent 162 serves as a user interface related to decoration of the sobot object. The viewer agent 163 provides a preview function of the sobot object. The update agent 165 updates the sobot schema of a production tool. The modem agent 166 provides a user interface function for the sobot schema. The resource agent 167 provides a user interface function for activity. The item agent 168 provides a user interface function for items. The scene agent 169 provides a user interface function related to a background image.

Figure 3:
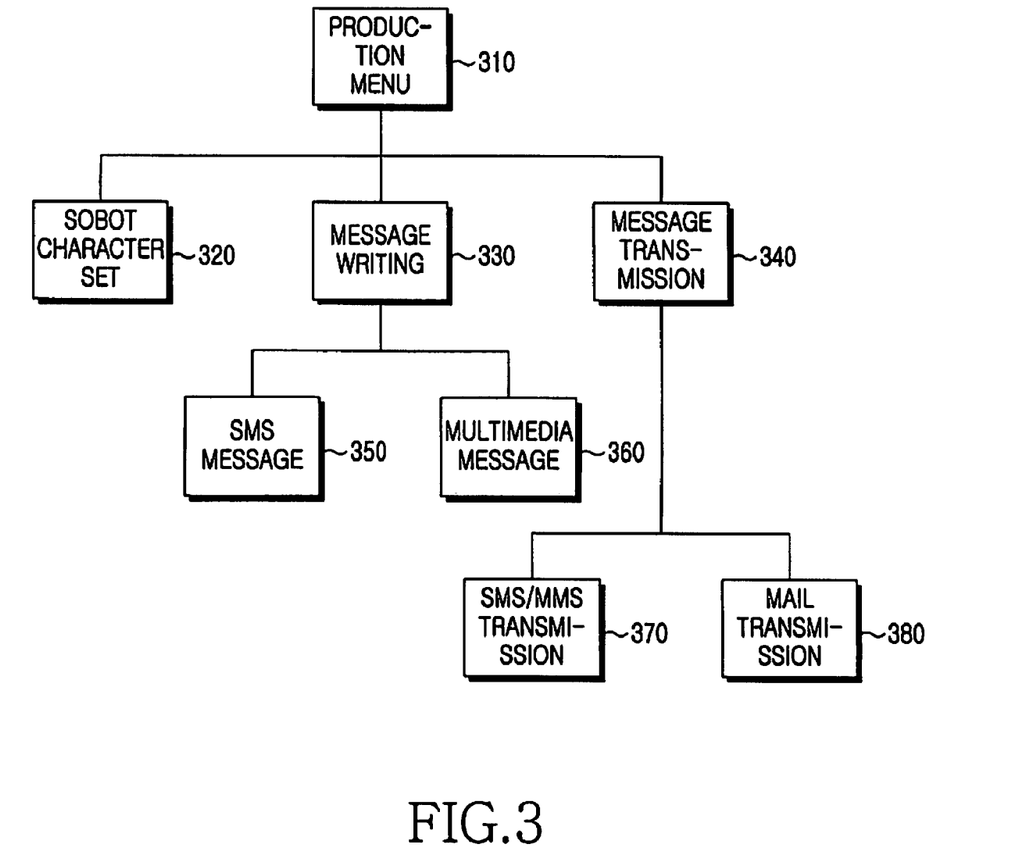
FIG. 3 illustrates a configuration of production menu according to the present invention.

FIG. 3 illustrates the configuration of a production menu according to the present invention. Herein, the production menu 310 may be classified into a sobot character set menu 320 for newly setting, storing and changing a sobot object, a message writing menu 330 for creating a sobot message including such a sobot, and a message transmission menu 340 for transmitting the sobot message. The message writing menu 330 has sub-menus, i.e., an SMS message menu 350 and a multimedia message menu 360 based on the types of sobot messages. The message transmission menu 340 has sub-menus, i.e., an SMS/MMS transmission menu 370 and a mail transmission menu 380 based on the transmission schemes.

Figure 4:
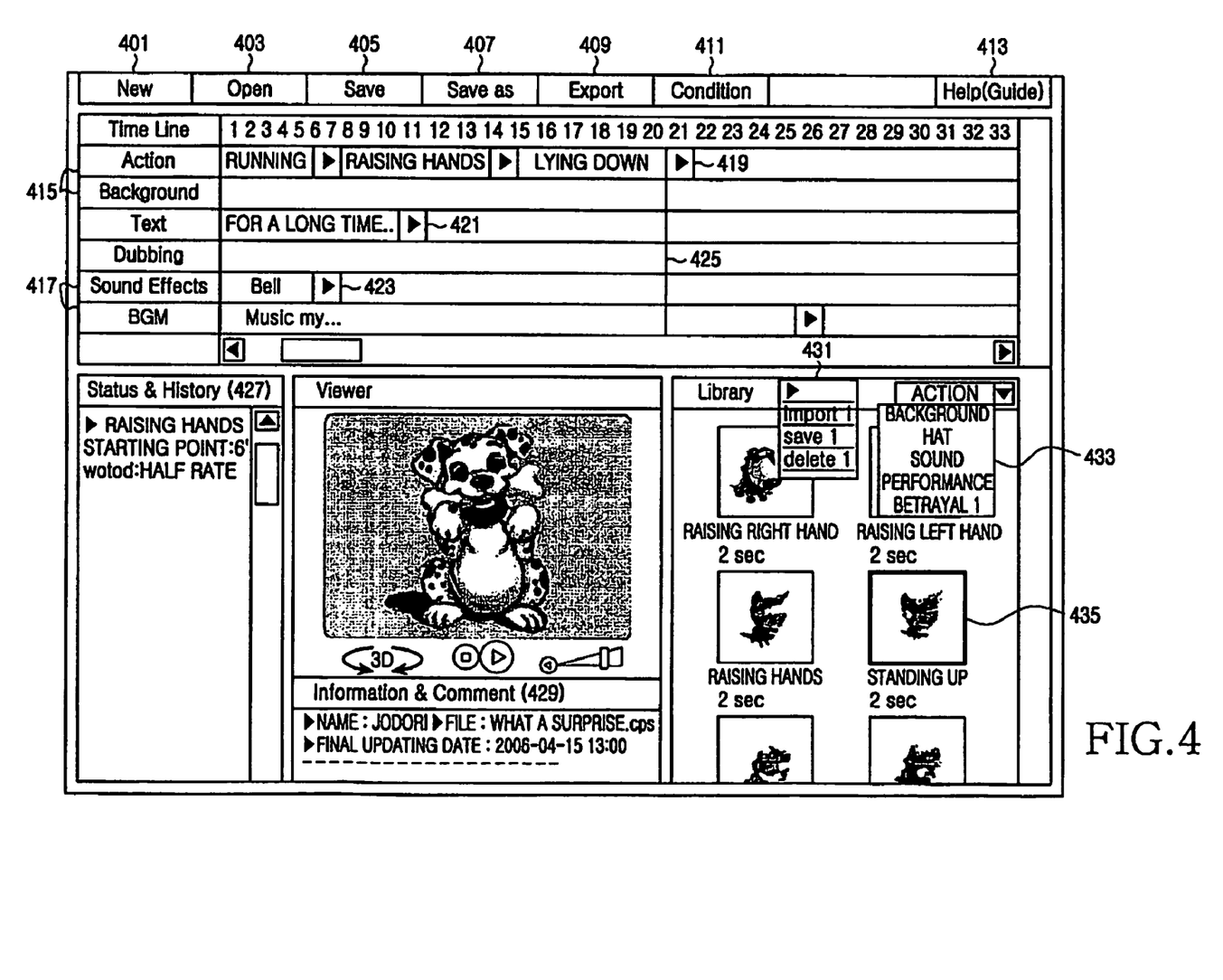
FIG. 4 illustrates a configuration of a graphic user interface of the software robot message menu according to the present invention.

FIG. 4 illustrates the configuration of a graphic user interface of a user production menu in which the aforementioned menus are reflected. In the graphic user interface of the production menu, a "New" 401 refers to a menu for creating a new message, and an "Open" 403 refers to a menu for selecting a sobot to be included in a message. A puppy sobot is selected in FIG. 4. A "Save" 405 refers to a menu for storing a message being currently produced, and a "Save as" 407 refers to a menu for storing the message with another name. An "Export" 409 refers to a menu for rendering and storing an output file with another name. An "Action/Background" 415 refers to a menu for setting the operation and background of a sobot object, or for setting a sobot's background included in the message and an action performed by the sobot.

The sobot performs an action that has been determined by the artificial life engine 20 according to a user input. However, the sobot may perform a specific action specified by the user. Since a sobot included in and transmitted with the sobot message does not include all the genetic information of the corresponding sobot object, and since it is probable that a receiving-side terminal does not include the artificial intelligence engine 20, the sobot can not be expected to express a behavior by itself, so that the sobot is set to perform an action currently set by the artificial life engine 20 or an action directly specified by a user.

The "Action/Background" 415 is designed for setting these actions of the sobot, in which a selected action is displayed in an action channel and a background is displayed in a background channel. The user can intuitively configure a plurality of actions by setting the execution period of each action based on a unit of time on a time line, and an actual period is adjusted by moving a time slot 425 based on the unit time.

The actions selected in FIG. 4 include running, raising hands and lying down, wherein each of the actions is set to be executed for seven time units. In addition, an auxiliary menu selection tag 419 for selecting the number of repetitions, a continual repetition, or a deletion, when a selected action is displayed in the action channel is also displayed. Additionally, when an action is set, a condition to perform the set action may be set together, in which such a condition is supported by a "Condition" 411. For example, it is possible to set such a condition that an action of raising hands is performed when "hand" is input by the user. In this case, an interface enabling the user to select the input "hand" is included in the sobot message.

A "Sound Effects/(BackGround Music) BGM" 417 refers to a menu for setting BGM or sound effects to be included in a message. When a selected sound effect is displayed in a sound-effect channel, an auxiliary menu selection tag 423 is also displayed. A "Text" 421 refers to a text writing menu for transmission message contents to be included in a message, in which it is possible to set the font, the size and the display scheme of the text, and a message to be inserted is displayed in a text channel. A "Status&History" 427 refers to a status information history window, which displays function performance statuses of a background decoration and an action production for a sobot and the results thereof in the form of a text.

An "Information&Comment 429, which is included in a "Viewer" window of displaying a currently selected sobot, refers to a window for displaying fundamental information on a message currently being produced, and simple information on all the sets for a sobot. A "Library" window provides a setting item list including actions and resources, for example, a background, a sound, an item and other resources, which can be set for a sobot provided by the sobot platform 10, and displays an entity list 435 of selected setting items. The "Library" window includes an item selection tag 433 for selecting an item from the list, and a library import/save/delete menu 431 for managing and storing, in the library, the setting information corresponding to each setting item currently set for a sobot. The "Library" window includes a menu for requesting an update related to each of the setting items.

According to a user's selection input through the graphic user interface of the production menu configured as described above, user interfaces and agents related the input, among the user interfaces 151, 152, 153 and 154 and agents 161 to 169 of the production application unit 170 as shown in FIG. 2, transmit/receive command functions described in Table 6 to Table 14 below so as to perform the production action and to manage the update of the setting items. According to the production operation and the update management of the setting items, Table 6 includes command functions received by the action-edit agent 161, Table 7 includes command functions received by the decoration agent 162, Table 8 includes command functions received by the viewer agent 163, Table 9 includes command functions received by the update agent 165, Table 10 includes command functions received by the modem agent 166, Table 11 includes command functions received by the item agent 168, Table 12 includes command functions received by the resource agent 167 and Table 13 includes command functions received by the scene agent 169.

TABLE 6

| | |
|---|---|
| getLibraryList( ) | Retrieve a library list of an action production. |
| getLibraryItem( ) | Retrieve item information of a selected library of an action production. |
| saveLibraryItem( ) | Store item information of an action production. |
| deleteLibraryItem( ) | Delete item information of an action production. |
| addItemToChannel( ) | Add an item of an action production to a channel of a timeline. |
| getSobotSchema( ) | Retrieve sobot schema information of an action production. |
| saveSobotSchema( ) | Store sobot schema information of an action production. |
| getAction( ) | Retrieve action data. |
| saveAction( ) | Store action data. |
| deleteAction( ) | Delete action data. |

TABLE 7

| | |
|---|---|
| getItemList( ) | Retrieve an item list of decoration. |
| showItem( ) | Request showing an item of decoration when dragging & dropping a viewer. |
| saveItem( ) | Store an item of decoration. |
| getSobotSchema( ) | Retrieve sobot schema data of decoration. |
| importSobotSchema( ) | Call sobot schema data of decoration. |

TABLE 8

| | |
|---|---|
| viewModel( ) | Request showing sobot schema data through viewer. |
| rotateModel( ) | Request rotating sobot schema data in viewer. |
| ngeViewMode( ) | Request change mode showing sobot schema data through viewer into a sobot or background |

TABLE 9

| | |
|---|---|
| updateComposer( ) | Request update of sobot schema of a production tool. |

TABLE 10

| | |
|---|---|
| getModel( ) | Retrieve sobot schema data. |
| saveSobotSchema( ) | Store sobot schema data. |
| deleteSobotSchema( ) | Delete sobot schema data. |

TABLE 11

| | |
|---|---|
| getItem( ) | Retrieve item data. |
| saveItem ( ) | Store item data. |
| deleteItem ( ) | Delete item data. |

TABLE 12

| | |
|---|---|
| getResource( ) | Retrieve resource data. |
| saveResource ( ) | Store resource data. |
| deleteResource ( ) | Delete resource data. |

TABLE 13

| | |
|---|---|
| getScene( ) | Retrieve scene data. |
| saveScene( ) | Store scene data. |
| deletescene( ) | Delete scene data. |

Figure 5:
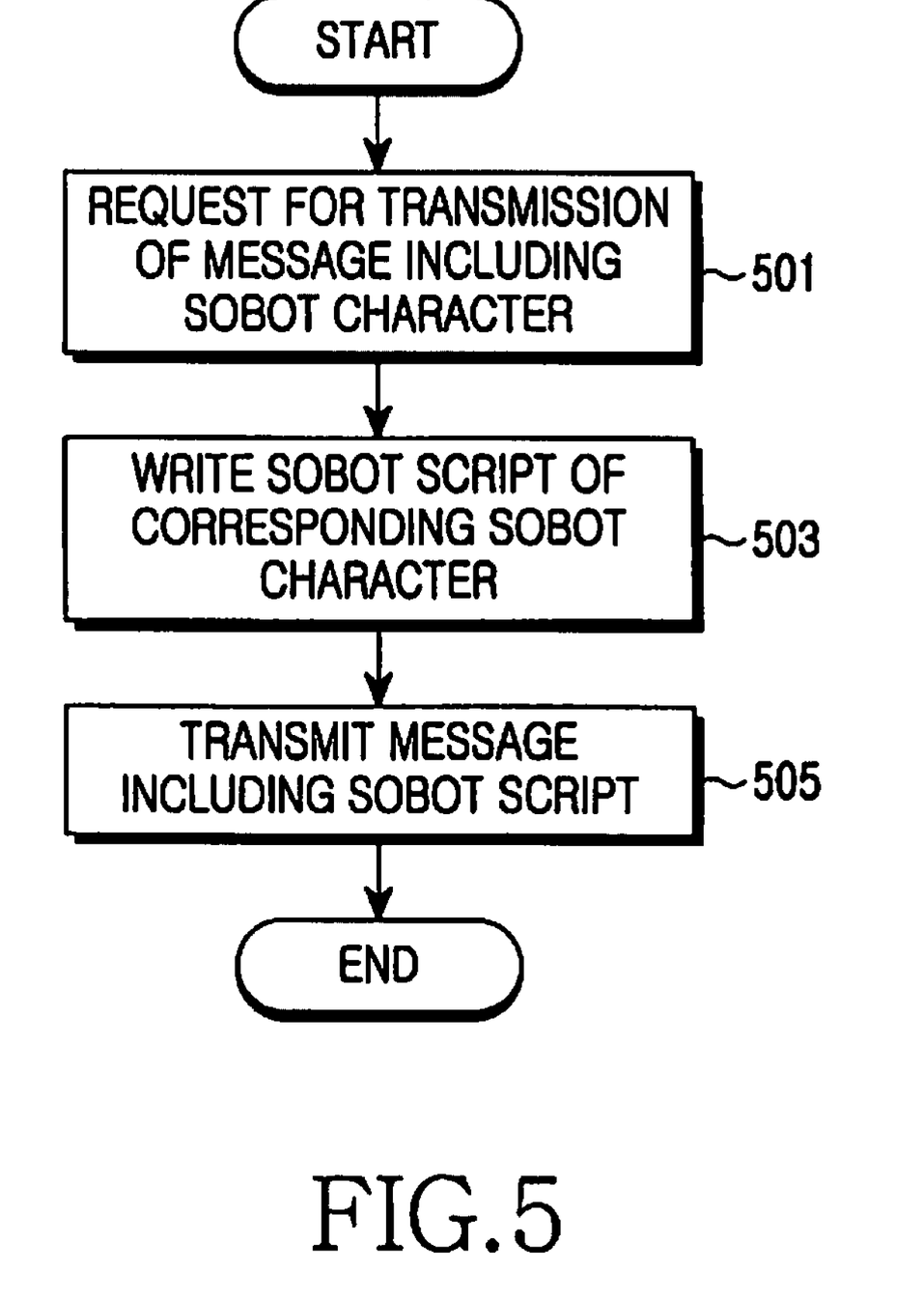
FIG. 5 illustrates an operational process of the software robot terminal according to the present invention.

FIG. 5 illustrates a procedure of constructing and transmitting a sobot message according to the present invention in the first sobot terminal 200 configured as previously described. At step 501, when a message including a sobot character is requested to be transmitted, the first sobot terminal 200 provides the user with the graphic user interface of FIG. 4, which is a sobot message production interface. The user produces a sobot object to be attached by using the provided interface and constructs the contents of a message. In this case, the user may produce only an action and/or resource applicable to a sobot. That is, the user can set only a specific action and include the specific action in a sobot message without including a sobot object in the sobot message, and the same is true for a resource, which can be set in a sobot, as well as an action. Accordingly, at step 503, the first sobot terminal 200 constructs a sobot object or constructs a sobot action or sobot resource according to the input of the user, and creates a corresponding transmission script file. At step 505, the first sobot terminal 200 attaches the transmission script file to the sobot message and transmits the sobot message. Accordingly, the first sobot terminal 200 can transmit a message including a specific sobot action or sobot resource setting, besides a sobot message including a specific sobot object.

When a receiving-side terminal receives and outputs a corresponding message, the receiving-side terminal executes a transmission script file included in the message. If the transmission script file includes a specific sobot object, the sobot terminal outputs the corresponding sobot object. In contrast, if the transmission script file includes only the specific action or resource setting, the sobot terminal applies the contents included in the transmission script file to a sobot object selected by the user among sobot objects stored in the sobot terminal, and then outputs the sobot object.

A mail-attachment sobot produced as described above is scripted into a transmission script file by the script engine 80 according to the present invention and is included in a message. The transmission script file refers to a file scripting a sound, an image and a sobot's action related to a sobot object included in a sobot message, in order to easily to transmit the sobot message by reducing the message capacity. The configuration of the transmission script file is defined as built-in functions, conditional statements, operations keywords, and attributes thereof. The built-in function represents the execution of a sound play, a background output, an action performance and the like, and may be controlled by the conditional statements and/or operations. Internal variables are classified into a variable representing a fundamental attribute and a user-defined input variable that must be preset before being used.

The built-in functions include functions described in Table 14 below.

TABLE 14

| | |
|---|---|
| StartUp( ) | StartUp( ): script start function. One function of StartUp( ) must be defined. |
| PlaySound( ) | PlaySound( ): Play sound. |
| StopSound( ) | StopSound( ): Stop sound. |
| ShowBackground( ) | ShowBackground (nBkID, bShow): Output a background . . . |
| Action( ) | Action (ActionID, ActionHandler): Perform a specified action. |
| Tooltip( ) | Tooltip (sg, time): Show a message during the specified time. |
| Command( ) | Command (CommandID Param_1, Param_2, Param_3, Param_4): Execute a specified command (extension function) |

The operations include the operation codes described in Table 15 below.

TABLE 15

| | |
|---|---|
| = | Substitution operation |
| ==, >, <, >=, <= | Comparison operation |
| +, −, *, / | Arithmetic operation: in case of an operand of number |

The conditional statement and the keyword variables include factors described in Table 16.

TABLE 16

| | |
|---|---|
| Conditional sentence | if~else, while |
| Keyword | function, object, if, else, while, var |
| Variable | A variable beginning with $ corresponds to an attribute. A variable beginning with @ corresponds to an input variable to be set before used as a user-defined attribute. |

The attributes of the variables beginning with the $ are described in Table 17.

TABLE 17

| Object | Attribute | Description |
|---|---|---|
| StartUp | $Type | Script type |
| | $Title | Script title (name) |
| | $Desc | Description |
| | $Entry | Start entry point(function) |
| ActionHandler | $Target | ID of Target model to which an action is applied |
| | $ActionID | ID of action to be performed |
| | $Times | The number of repetitions |
| | $Event | Event handler |

TABLE 17-continued

| Object | Attribute | Description |
|---|---|---|
| EventHandler | $Source | Event source model ID |
| | $EventType | Event type (KEY, MOUSE) |
| | $Code | Event code |
| | $Param | Event parameter |
| | $Times | The number of repetitions currently being performed when the performance is being repeated |
| | $Time | Time elapsed from action start |
| Tooltip | $Msg | Message text to be output |
| | $Time | Output time |
| | $Type | Tooltip type |
| | $BkColor | Background color |
| | $textColor | Text color |
| | $Font | Font type |
| Universal Attribute | $Model | Model number, Script execution target model |

An example of the script file defined as the built-in functions, the conditional sentences, the operations, the keywords and the attributes thereof is shown in Tables 18 and 19, in which Table 18 shows an example of a basic action script file, and Table 19 shows an example of a transmission script file attached to a sobot.

TABLE 18

Basic Action Script

```
// Basic action script applied to action file
Object StartUp( )
{
    //Property
    $Type = Action
    $Title = "Waving right hand "
    $Desc = "Wave right hand."
    $Entry = StartAction( )
}
function StartAction( )
{
    Action(#1, NULL) //#1 □∆ Right hand waving action ID, NULL □∆
DefaultActionHandler(#1)
}
function DefaultActionHandler(ActionID)
{
    $Target = $Model
    $ActionID = ActionID
    $Times = 1
    $Event = NULL
}
```

TABLE 19

Transmission Script (waving bands)

```
Object StartUp( )
{
    //Property
    $Type = Action
    $Title = "Waving hands"
    $Desc = "Alternately waving hands."
    $Entry = StartAction ( )
    var @Msg = "Glad to meet you"
}
function StartAction( )
{
    Action(#1, ActionHandler)   //#1 □∆ Right
hand waving action ID, NULL □∆
ctionHandler(#1)
    Action(#2, ActionHandler)   //#1 □∆ Left
hand waving action ID, NULL □∆ ActionHandler
(#2)
}
```

TABLE 19-continued

Transmission Script (waving bands)

```
Object ActionHandler (ActionID)
{
  $Target = $Model
  $ActionID = ActionID
  $Times = 1
  $Event = EventHandler
}
Object EventHadler( )
{
  $Source = $Model      //Built-in
  $EventType =          //Built-in
  $Code =               //Built-in
  $Param =              //Built-in
  $Times =              //Built-in
  if(EventType == KEY)
  {
    if(Code == NUM_1)
    {
      Tooltip(MyTooltip, @Msg, time)
    }
  }
}
Object MyTooltip(Msg, time)
{
  $Msg= Msg
  $Time = time       //Output time
  $Type = 3          //Tooltip type
  $BkColor = Yellow
  $textColor = Black
  $Font = Arial
}
```

Since a script file constructed as above has a small size, it is easier to transmit/receive messages.

As described above, the present invention relates to transmission and reception of a new conceptual moving picture message/mail using a unique artificial life gene, which is scripted by using a gene-based software robot and various productions (e.g., shape/item/action/sound effect) data, in various sobot terminals. The present invention can provide continuous amusement and interest, such as communities in various terminals or virtual spaces, following the trend of individualization/differentiation, and accelerate a differentiation of a mobile terminal and a Wireless broadband (Wibro) phone. In addition, according to the present invention, it is possible to induce continuous interest through a friendly competition among users, such as a moving image production contest, an artificial life shape contest and a message contest, and through various events (e.g., birthday, graduation or marriage). Also, according to the present invention, it is possible to easily connect with Content Providers (CPs), such as a community, a shopping mall and a game.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting, from a sending terminal to a receiving terminal, a software robot (sobot) message which includes a sobot object having a genetic code, the method comprising the steps of:
producing, by the sending terminal, a configuration related to the sobot object, to be included in the sobot message according to a user input; and
generating a first transmission script file by scripting the sobot object according to the user input when the production is completed, inserting the first transmission script file into the sobot message configured according to the input, and transmitting, by a communication unit of the sending terminal, the sobot message to the receiving terminal; and
generating a second transmission script file by scripting action and resource settings applicable to a sobot having a genetic code according to the user input when the production is completed, inserting the second transmission script file into the sobot message, and transmitting the sobot message.

2. The method as claimed in claim 1, wherein, in the step of producing the sobot object, a shape, an action, a set item, a set sound effect and a background of the sobot object are determined.

3. The method as claimed in claim 2, wherein, when an action of the sobot is set, a condition for outputting the set action is set.

4. The method as claimed in claim 3, wherein at least one of the script files is defined by a built-in function, a conditional statement, an operation, a keyword, variables, and attributes thereof.

5. The method as claimed in claim 4, wherein the built-in function includes start up, play sound, stop sound, show background, action, tooltip and command functions.

6. The method as claimed in claim 5, wherein the operation includes substitution, comparison and arithmetic operation codes.

7. The method as claimed in claim 6, wherein the conditional statement includes if, else or while, the keyword includes function, object, if, else and while, and variables include a variable beginning with the symbol $ corresponding to an attribute, and a variable beginning with the symbol @ corresponding to a preset input variable.

8. The method as claimed in claim 7, wherein each attribute of the variables beginning with the symbol $ includes at least one of startup, action handler, even handler, tooltip and universal attribute.

* * * * *